United States Patent Office 2,759,006
Patented Aug. 14, 1956

2,759,006

HIGH PRESSURE POLYMERIZATION OF ALKYLCYCLOTRISILOXANES

Milton L. Dunham, Jr., Kenmore, and George H. Wagner, Clarence, N. Y., assignors to Union Carbide and Carbon Corporation, a corporation of New York No Drawing. Application June 10, 1953, Serial No. 360,832

12 Claims. (Cl. 260—448.2)

This invention relates to organosiloxane polymers and to a process for the preparation thereof. More particularly the invention relates to an improved process for preparing alkylsiloxane polymers by the polymerization of alkylcyclotrisiloxanes.

Alkylcyclotrisiloxanes are cyclic compounds which contain alternate silicon and oxygen atoms and which have either, two alkyl radicals bonded to each silicon atom, or both an alkyl radical and a hydrogen atom bonded to each silicon atom. These alkylcyclotrisiloxanes have the general formula $[RR'SiO]_3$ where R is an alkyl radical and R' may be either a hydrogen atom or an alkyl radical. Such compounds are known to polymerize to high molecular weight polymers when treated with an acid or alkaline catalyst at room temperatures or as is required with particular cyclotrisiloxanes with the additional aid of heat. The hexaalkylcyclotrisiloxanes polymerize to dialkylsiloxane polymers while the trialkylcyclotrisiloxanes, of the formula $(RSiHO)_3$ polymerize to monoalkylsiloxane polymers of the formula $—(RSiHO)_x—$.

It is well known that the molecular weight of the polymeric chains prepared by the above process may be readily controlled by the addition of appropriate amounts of chain terminators or endblocking compounds which normally comprise silicon-containing compounds having only one functional group bonded to one silicon atom thereof. The other groups bonded to the silicon atom or atoms of the compound are non-functional, that is, they do not readily react with the terminal groups of the siloxane polymer chain. Such chain endblocking compounds react with terminal groups of a polymer chain through their single functional group and upon so doing, limit further growth of such chains. In this manner the molecular weights of the siloxane polymers and consequently, the viscosity of the product may be readily controlled so as to prepare fluids varying from light oils to greases. Such endblocked polymers are widely employed as lubricants, plasticizers, additives or as coatings for numerous purposes.

We have found that alkylcyclotrisiloxanes may be polymerized without the use of a catalyst. Our invention accomplishes the polymerization of alkylcyclotrisiloxanes to alkylsiloxane polymers by compressing such cyclosiloxanes at pressures of at least 1500 pounds per square inch. As no catalyst is necessary to effect the polymerization of alkylcyclotrisiloxanes, it is readily seen that the process of our invention eliminates a normally essential step of the prior art processes. Specifically, when a catalyst is employed to polymerize cyclosiloxanes, it is necessary to remove the catalyst from the product as it oftentimes causes corrosion of various metals if contacted therewith. Such catalysts if allowed to remain in the product also may cause depolymerization.

In the practice of our invention pressures of at least 1500 pounds per square inch are required. We prefer to employ pressures which vary from about 15,000 to about 100,000 pounds per square inch. The process of our invention may be conducted under static conditions by charging a reactor to maximum capacity with the cyclosiloxane, sealing and applying pressure hydrostatically by heating the charge. In this type of operation it is necessary to provide the reactor with an automatic back pressure valve to vent some of the charge in the event that pressures which may damage the system are being approached. It is also possible to conduct static operation of the process by charging the cyclosiloxane to an open reactor and applying pressure upon the charge through the open end of the reactor by means of a hydraulic press or a high pressure fluid intensifier. The hydraulic intensifier is a piston type pump and may be operated to exert high pressures by the application of a moderate pressure to the low pressure end thereof.

Our invention may also be conducted under continuous flow conditions in suitable continuous flow apparatus designed to withstand the pressures required and equipped with suitable heating means. We prefer to employ a heavy walled tube type reactor so that positive flow through the reaction zone is maintained. The pressure may be applied to the system by means of high pressure plunger pump operated by mechanical means or it may be applied by means of the hydraulic intensifier pump which has the obvious advantage of automatic pressure control.

The following examples, which were conducted at a temperature in the range of from about 100° C. to 350° C., more fully illustrate the invention. In the examples below, the extent of polymerization obtained is referred to in terms of the relative viscosity of the product. A product identified as being slightly viscous, will have an approximate viscosity at 25° C. of from about 1000 to about 2000 centipoises; a viscous product will have an approximate viscosity at 25° C. of from about 2000 to 10,000 centipoises; a very viscous product will have an approximate viscosity at 25° C. of from about 10,000 to about 50,000 centipoises, and an extremely viscous product will have a viscosity of above 50,000 centipoises at 25° C.

Example I

Approximately 20 cc. of hexaethylcyclotrisiloxane, obtained by the vacuum fractionation from the crude condensate of hydrolyzed diethyldichlorosilane, was charged to a soft lead capsule equipped with a tapered plug seal. The insertion of the tapered plug served to force out a few drops of the charge thereby insuring a completely full capsule. The capsule was then positioned within a heavy walled, heat treated alloy steel cylinder equipped with a supporting plug at one end thereof. A steel plug was inserted in the open end of the cylinder and rested upon the capsule, and served to transmit force applied from a hydraulic press to the capsule, thus developing pressure upon the charge. A close fitting electric resistance furnace, positioned about the cylinder, supplied heat to the charge. The temperature was measured by means of a thermocouple inserted between the furnace and cylinder walls. The charge was heated to a temperature of 250° C. and a pressure of approximately 100,000 pounds per square inch was applied by the press. These conditions were maintained for a period of 18 hours at which time heating was discontinued and the vessel cooled to a temperature below 100° C. by means of an air blast. The pressure was then released and the capsule withdrawn and emptied. The polymerized hexaethylcyclotrisiloxane was extremely viscous and tended to form strings or fibers as it was poured from the capsule.

Example II

Employing the identical procedure and apparatus as disclosed in Example I, a 20 cc. charge of hexaethylcyclotrisiloxane was heated to a temperature of 250° C. and subjected to a pressure of approximately 50,000 pounds per square inch. These conditions were maintained for a period of 18 hours at which time heating was discontinued and the vessel cooled to a temperature below 100° C. by means of an air blast. The pressure was then released and the capsule withdrawn and emptied. A very viscous polymerized hexaethylcyclotrisiloxane product was obtained.

*Example III*

Employing the identical procedure and apparatus as disclosed in Example I, a 20 cc. charge of hexaethylcyclotrisiloxane was heated to a temperature of 250° C. and subjected to a pressure of approximately 18,000 pounds per square inch. These conditions were maintained for a period of 18 hours at which time heating was discontinued and the vessel cooled to a temperature below 100° C. by means of an air blast. The pressure was then released and the capsule withdrawn and emptied. A very viscous polymerized hexaethylcyclotrisiloxane product was obtained.

*Example IV*

Employing the identical procedure and apparatus as disclosed in Example I, a 20 cc. charge of hexaethylcyclotrisiloxane was heated to a temperature of 250° C. and subjected to a pressure of approximately 18,000 pounds per square inch. These conditions were maintained for a period of 8 hours at which time heating was discontinued and the vessel cooled to a temperature below 100° C. by means of an air blast. The pressure was then released and the capsule withdrawn and emptied. A very viscous polymerized hexaethylcyclotrisiloxane product was obtained.

*Example V*

Employing the identical procedure and apparatus as disclosed in Example I, a 20 cc. charge of hexamethylcyclotrisiloxane was heated to a temperature of 250° C. and subjected to a pressure of approximately 18,000 pounds per square inch. These conditions were maintained for a period of 18 hours at which time heating was discontinued and the vessel cooled to a temperature below 100° C. by means of an air blast. The pressure was then released and the capsule withdrawn and emptied. A very viscous polymerized hexamethylcyclotrisiloxane product was obtained.

From the above examples it is readily seen that alkylcyclosiloxanes may be polymerized to relatively high molecular weight viscous alkylsiloxane polymers by the use of high pressures. Of course lower molecular weight alkylsiloxane polymers having lower viscosities may be prepared by our process from alkylcyclotrisiloxanes by the addition of appropriate amounts of chain terminators or endblocking compounds before the application of pressure.

The larger ring systems of alkylcyclosiloxanes, containing one alkyl radical and one hydrogen atom bonded to each silicon atom such as tetraethylcyclotetrasiloxane, of the formula $[C_2H_5SiHO]_4$, and pentaethylcyclopentasiloxane, of the formula $[C_2H_5SiHO]_5$, may also be polymerized by the method of this invention. Such may be readily accomplished by following the procedure disclosed above for the polymerization of hexaalkylcyclotrisiloxanes.

These alkylcyclosiloxanes having one hydrogen atom and one alkyl radical bonded to each silicon atom, which may be polymerized by the process of the invention, have the formula $[RHSiO]_y$ where R is an alkyl radical and y is an integer of from 3 to 5.

We claim:

1. A process of polymerizing an alkylcyclotrisiloxane to an alkylsiloxane polymer which comprises compressing said alkylcyclotrisiloxane under substantially anhydrous conditions at a pressure of at least 1500 pounds per square inch.

2. A process of polymerizing a hexaalkylcyclotrisiloxane to a dialkylsiloxane polymer which comprises compressing said hexaalkylcyclotrisiloxane under substantially anhydrous conditions at a pressure of at least 1500 pounds per square inch.

3. A process of polymerizing a hexaalkylcyclotrisiloxane to a dialkylsiloxane polymer which comprises compressing said hexaalkylcyclotrisiloxane under substantially anhydrous conditions to a pressure of from about 1500 to about 100,000 pounds per square inch.

4. A process of polymerizing hexamethylcyclotrisiloxane to a dimethylsiloxane polymer which comprises compressing said hexamethylcyclotrisiloxane under substantially anhydrous conditions to a pressure of at least 1500 pounds per square inch.

5. A process of polymerizing hexaethylcyclotrisiloxane to a diethylsiloxane polymer which comprises compressing said hexaethylcyclotrisiloxane under substantially anhydrous conditions to a pressure of at least 1500 pounds per square inch.

6. A process of polymerizing hexamethylcyclotrisiloxane to a dimethylsiloxane polymer which comprises compressing said hexamethylcyclotrisiloxane under substantially anhydrous conditions to a pressure of from about 1500 to about 100,000 pounds per square inch.

7. A process of polymerizing hexaethylcyclotrisiloxane to a diethylsiloxane polymer which comprises compressing said hexaethylcyclotrisiloxane under substantially anhydrous conditions at a pressure of from about 15,000 to about 100,000 pounds per square inch.

8. A process of polymerizing a trialkylcyclotrisiloxane to a monoalkylsiloxane polymer which comprises compressing said trialkylcyclotrisiloxane under substantially anhydrous conditions at a pressure of at least 1500 pounds per square inch.

9. A process of polymerizing a cyclosiloxane having the formula $[RHSiO]_y$ wherein R is an alkyl radical and y is an integer from 3 to 5, to alkylsiloxane polymers which comprises compressing said cyclosiloxane under substantially anhydrous conditions at a pressure of at least 1500 pounds per square inch.

10. A process of polymerizing an alkylcyclosiloxane, having the formula $[RR'SiO]_3$ where R is an alkyl radical and R' is a member of the group consisting of hydrogen and an alkyl radical which comprises compressing said alkylcyclosiloxane under substantially anhydrous conditions at a pressure of at least 1500 pounds per square inch.

11. A process of polymerizing a dialkylcyclotrisiloxane to a dialkylsiloxane polymer which comprises compressing said dialkylcyclotrisiloxane under substantially anhydrous conditions at a pressure of at least 1500 pounds per square inch.

12. A process of polymerizing an alkylcyclosiloxane, having the formula $[RR'SiO]_3$ where R is an alkyl radical and R' is a member of the group consisting of hydrogen and an alkyl radical which comprises compressing said alkylcyclosiloxane under substantially anhydrous conditions at a pressure of at least 1500 pounds per square inch and heating said dialkylcyclotrisiloxane while applying pressure at a temperature of from about 100° C. to about 350° C.

References Cited in the file of this patent

UNITED STATES PATENTS

| | | |
|---|---|---|
| 2,552,247 | Wormuth | May 8, 1951 |
| 2,607,792 | Warrick | Aug. 19, 1952 |

FOREIGN PATENTS

| | | |
|---|---|---|
| 859,671 | Germany | Jan. 5, 1953 |